United States Patent
Mustafa et al.

(10) Patent No.: US 9,794,867 B2
(45) Date of Patent: Oct. 17, 2017

(54) RECONFIGURATION OF WIRELESS DEVICES FOR WIRELESS NETWORK ACCESS

(71) Applicant: Apple Inc., Cupertino, CA (US)

(72) Inventors: Yunis Naduvile Purayil Mustafa, San Jose, CA (US); Gregg Golembeski, Jr., San Francisco, CA (US); Robert J. Walsh, Sunnyvale, CA (US); Edward Thomas Mackowiak, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 262 days.

(21) Appl. No.: 14/803,764

(22) Filed: Jul. 20, 2015

(65) Prior Publication Data

US 2016/0316420 A1 Oct. 27, 2016

Related U.S. Application Data (60) Provisional application No. 62/153,347, filed on Apr. 27, 2015.

(51) Int. Cl.

| | |
|---|---|
| *H04W 48/16* | (2009.01) |
| *H04W 8/00* | (2009.01) |
| *H04W 48/04* | (2009.01) |
| *H04W 4/02* | (2009.01) |
| *H04W 12/08* | (2009.01) |
| *H04W 24/04* | (2009.01) |
| *H04W 48/12* | (2009.01) |

(52) U.S. Cl.
CPC ........... *H04W 48/16* (2013.01); *H04W 4/023* (2013.01); *H04W 8/005* (2013.01); *H04W 12/08* (2013.01); *H04W 24/04* (2013.01); *H04W 48/04* (2013.01); *H04W 48/12* (2013.01)

(58) Field of Classification Search
None
See application file for complete search history.

(56) References Cited

U.S. PATENT DOCUMENTS

| | | | | |
|---|---|---|---|---|
| 6,148,383 A | * | 11/2000 | Micka ................. | G06F 11/2074 711/162 |
| 8,532,071 B2 | * | 9/2013 | Seok .................... | H04W 80/02 370/338 |
| 8,542,613 B2 | * | 9/2013 | Rudolf ................... | H04L 12/12 370/254 |

(Continued)

OTHER PUBLICATIONS

Ruckus Wireless, Inc. (www.ruckuswireless.com), feature sheet, "Zone Connect™ Smart Device Provisioning and Security." Copyright 2012. 5 pages.

(Continued)

*Primary Examiner* — Alex Skripnikov
(74) *Attorney, Agent, or Firm* — Kilpatrick Townsend & Stockton, LLP (57) ABSTRACT

Updated network access information can be distributed to wireless devices that have joined a wireless network whose configuration is being or has been modified. In some instances, an update can be scheduled in advance and a notification provided from a base station to other devices on the network. In some instances, a portable wireless device can distribute updated network access information to other devices that had been on the network prior to the update in a partially or fully automated process.

20 Claims, 6 Drawing Sheets

(56) References Cited

U.S. PATENT DOCUMENTS

| | | | |
|---|---|---|---|
| 8,737,367 B2* | 5/2014 | Bitterlich | H04L 63/126 370/250 |
| 2005/0120106 A1 | 6/2005 | Albertao | |
| 2006/0193315 A1* | 8/2006 | Sinivaara | H04W 48/10 370/389 |
| 2009/0093247 A1 | 4/2009 | Srinivasan | |
| 2009/0182851 A1 | 7/2009 | King et al. | |
| 2009/0319663 A1 | 12/2009 | Giles et al. | |
| 2011/0075589 A1 | 3/2011 | Bradley et al. | |
| 2011/0090896 A1 | 4/2011 | Bradley | |
| 2012/0054493 A1 | 3/2012 | Bradley | |
| 2014/0366105 A1 | 12/2014 | Bradley et al. | |
| 2016/0050264 A1* | 2/2016 | Breed | H04L 41/06 709/217 |

OTHER PUBLICATIONS

Ruckus Wireless, Inc. (www.ruckuswireless.com), feature sheet, "Dynamic PSK™ Encryption Key Technology." Copyright 2012. 2 pages.
Cisco IOS Software Configuration Guide for Cisco Aironet Access Points, "Understanding Authentication Types." Chapter 10, Configuring Authentication Types. 18 pages.

* cited by examiner

RECONFIGURATION OF WIRELESS DEVICES FOR WIRELESS NETWORK ACCESS

CROSS-REFERENCE TO RELATED APPLICATIONS

This application claims the benefit of U.S. Provisional Application No. 62/153,347, filed Apr. 27, 2015, entitled "Reconfiguration of Wireless Devices for Wireless Network Access," the disclosure of which is incorporated by reference herein in its entirety.

BACKGROUND

The present disclosure relates generally to wireless networks and in particular to reconfiguration of wireless devices for wireless network access after a change to the wireless network configuration.

Wireless networking has become a popular option for enabling communication among various devices. A typical wireless network configuration includes a base station (or access point) and a number of devices (also referred to herein as "wireless" devices) that can establish communication sessions with the base station and thereby join a wireless network provided by the base station. The base station can facilitate communication between wireless devices joined to the network, e.g., by routing messages. In some cases, the base station can also facilitate communication between the wireless devices and a wide-area network, such as the Internet.

To prevent unauthorized devices from joining a network, a base station can be secured. For example, a network administrator can establish a password or other security credential(s) for a wireless network provided by a base station, and access to the wireless network can be granted only to those wireless devices that present the correct security credential(s) to the base station. From time to time, it may be desirable to change the security credential(s) for the wireless network, for example, if the credential(s) become known to a device whose presence on the wireless network is not desired by the network administrator.

SUMMARY

When a security credential or other network configuration information for a base station of a wireless network is changed, any devices that were previously joined to the wireless network may lose their connection to the wireless network and may not be able to rejoin the wireless network until they obtain the new security credential or other network configuration information. In wireless networks with a large number of connected wireless devices (e.g., in a so-called "smart home" environment or the like), providing new network configuration to each wireless device can be time-consuming. First, the user must remember which devices are joined to the network. Then the user must interact with each such device to provide the new credential. For some devices, such as devices with a limited user interface, this can be a difficult task.

Certain embodiments of the present invention relate to techniques for providing updated network access information to wireless devices that have joined a wireless network whose configuration is being or has been modified. The network access information can include, e.g., network name or other network identifier, security credential(s) and/or any other item of information that the wireless devices may need in order to join, rejoin, or remain connected to a wireless network. These techniques can simplify the task of providing updated network access information to a large number of wireless devices and/or to wireless devices with limited user interfaces.

In some embodiments, an update to a network configuration can be scheduled in advance. For example, a network administrator can set a new network name, password or other security credential, or other network configuration information at a base station and can instruct the base station to require all wireless devices on the network to use the new configuration information after a specified "effective" time, which can be any future time (e.g., "midnight tonight"). In advance of the effective time, the base station can send a notification message to wireless devices that are on the network to inform them of the scheduled update; the notification message can include new network access information. When the effective time arrives, the wireless devices can begin using the new network access information.

In some embodiments, updated network access information can be distributed to wireless devices after the update takes effect at the base station. For example, one wireless device can operate as a facilitator to distribute updated configuration to other wireless devices. The facilitator device can be any wireless device, such as a portable device (e.g., mobile phone, tablet, wearable device) that the user can easily carry from place to place within an environment where other wireless devices on the network may be located. The facilitator device can obtain updated network access information, e.g., via user input. Thereafter, the facilitator device can detect other wireless devices that are seeking to rejoin the wireless network. When the facilitator device detects such a wireless device, the facilitator device can establish a temporary ("ad hoc") point-to-point communication link with the other wireless device and provide the updated network configuration to the other wireless device through the temporary point-to-point communication link. The other wireless device can then use the updated network information to rejoin the wireless network.

In some embodiments, a facilitator device can limit the distribution of updated network access information to wireless devices that were previously (e.g., prior to the configuration update) joined to the wireless network. For example, the facilitator device can maintain a list of devices that it has "seen" on a specific wireless network. When the facilitator device detects a wireless device that is seeking to rejoin the wireless network, the facilitator device can determine whether the wireless device is on the list. As another example, the facilitator device can request user confirmation prior to delivering updated network access information to a particular wireless device.

In some embodiments, a facilitator device can limit the distribution of updated network access information to wireless devices with which the facilitator device comes into proximity. Proximity can be detected in various ways. For example, the facilitator device can use signal strength of a wireless signal received from another wireless device to estimate the distance between the devices and can determine whether to provide updated network access information to a particular wireless device based on the estimated distance.

The following detailed description together with the accompanying drawings will provide a better understanding of the nature and advantages of the present invention.

DETAILED DESCRIPTION

Certain embodiments of the present invention relate to techniques for providing updated network access information to wireless devices that have joined a wireless network whose configuration is being or has been modified. The network access information can include, e.g., network name or other network identifier, security credential(s) and/or any other item of information that the wireless devices may need in order to join, rejoin, or remain connected to a wireless network. These techniques can simplify the task of providing updated network access information to a large number of wireless devices and/or to wireless devices with limited user interfaces.

Figure 1:
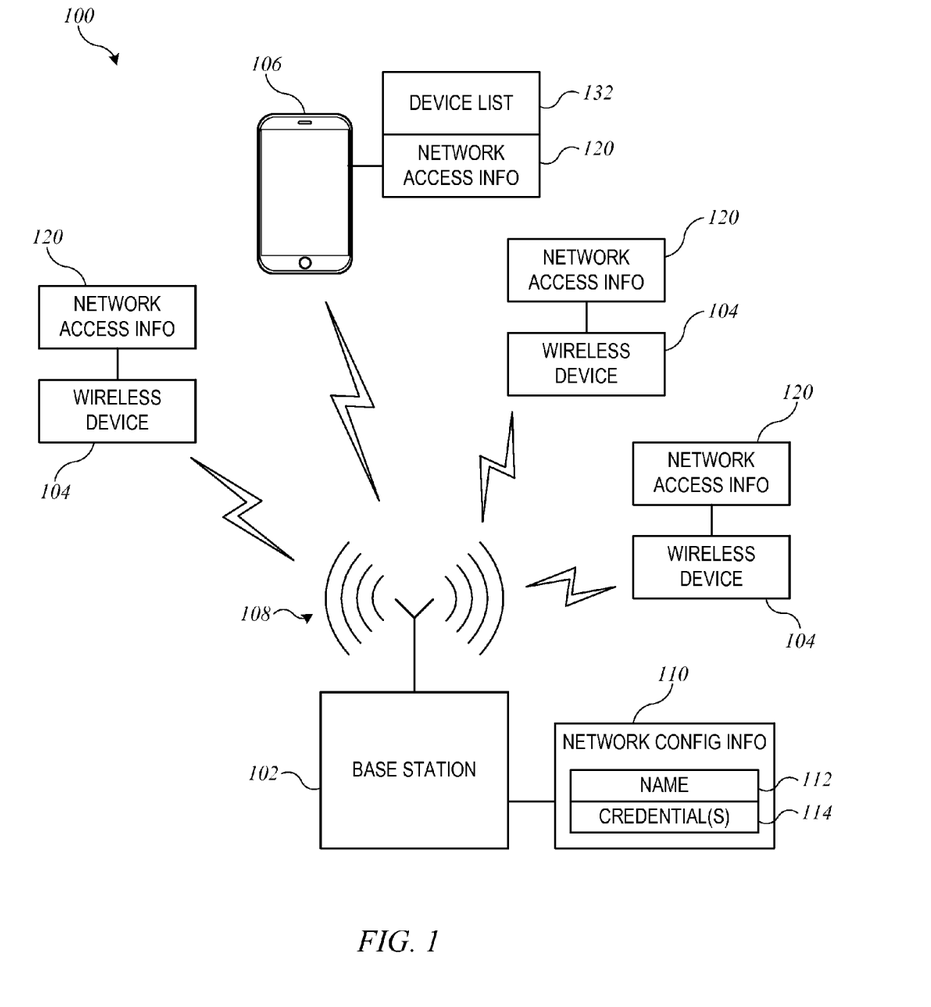
FIG. 1 shows a wireless network environment in which certain embodiments of the present invention can be practiced.

FIG. 1 shows a wireless network environment 100 in which certain embodiments of the present invention can be practiced. Wireless network environment 100 can include a base station 102, wireless devices 104, and a portable wireless device 106. Base station 102 can operate as a base station for a wireless network 108. For example, base station 102 can facilitate wireless communication among devices 104, 106 that have joined network 108 (e.g., by routing messages or providing routing information). In some embodiments, base station 102 can provide an access point for a wide-area network such as the Internet.

Base station 102 can maintain network configuration information 110 for wireless network 108. Network configuration information 110 can include, e.g., a network name 112 and valid security credential(s) 114 for accessing wireless network 108. Network name 112 can be, e.g., a service set identifier (SSID) as used in networks that comply with Wi-Fi® networking standards and protocols promulgated by the Wi-Fi Alliance (referred to herein as "Wi-Fi networks"). Security credential 114 can include, e.g., a password, pass phrase, access key, or other item of information that can be used to provide proof to base station 102 that a particular wireless device has been authorized to join wireless network 108. (The proof can be, e.g., a cryptographic proof of possession of a shared secret, with the security credential functioning as at least a portion of the shared secret.) In some embodiments, multiple names 112 and/or security credentials 114 may be concurrently valid.

Each wireless device 104 can be an electronic device that is capable of communicating via wireless network 108. As used herein, a "wireless device" can include any type of electronic device that is capable of joining a wireless network. Examples include desktop or laptop computers, tablet computers, smart phones, other mobile phones, wearable devices (e.g., watches, head-mounted displays, etc.), media devices (e.g., devices capable of delivering media content from local and/or remote sources to a display and/or speakers), household appliances (e.g., clothes washers, dishwashers, refrigerators, stoves, heating/cooling systems, etc.), environmental control devices (e.g., thermostats, light fixtures, electrical switches), security devices (e.g., door locks, door openers, cameras, motion sensors, etc.), and so on. Each wireless device 104 can obtain and store network access information 120 for wireless network 108. Network access information 120 can include, e.g., a network name and security credential; other information can also be included (e.g., preferred signaling protocols, etc.). Network access information 120 can include any information usable by wireless device 104 to join, rejoin, and/or remain connected to wireless network 108. In some embodiments, network access information 120 can include some or all of network configuration information 110. For purposes of the present description, it is assumed that each wireless device 104 has already obtained and stored initial network access information 120 and has joined wireless network 108. The particular manner in which a wireless device obtains initial network information 120 is not critical to understanding the present invention; conventional or other techniques for configuring a new wireless device to join a wireless network can be used.

Portable wireless device 106 can be any wireless device that is portable. For example, portable wireless device 106 can have a form factor such that the user can easily carry it from place to place within environment 100 and can also have its own internal power supply (e.g., a battery) so that it can operate while being carried from place to place. Examples include laptop computer systems, tablet computer systems, smart phones or other mobile phones, and wearable devices. Like other wireless devices 104, portable wireless device 106 can obtain and store network access information 120 for wireless network 108. In some embodiments, portable wireless device 106 can also store other information regarding wireless network 108, such as device list 132, which can be a list of wireless devices 104 that have been visible to portable wireless device 106 on wireless network 108.

In operation, any or all of wireless devices 104 and/or portable wireless device 106 can independently join wireless network 108. Standard procedures for joining a device to a wireless network can be used. For example, base station 102 can broadcast an SSID or other network name for wireless network 108 on a particular wireless channel, and wireless device 104 can send a request on that channel to join wireless network 108. The request can be granted upon presentation by wireless device 104 to base station 102 of proof that wireless device 104 is in possession of a valid security credential for wireless network 108. As another example, base station 102 can operate wireless network 108 as a "hidden" network, and wireless device 104 can broadcast a probe message that includes the SSID (or other network name), to which base station 102 can respond. Once joined to wireless network 108, wireless devices 104 and/or portable wireless device 106 can use wireless network 108 to communicate with each other and with any other devices or services (e.g., Internet-based services) that may be accessible via wireless network 108.

From time to time, it may be desirable to update (or modify) network configuration information 110 maintained by base station 102. For example, a concern may arise that security credential 114 has been compromised, which might result in unauthorized devices being able to join wireless network 108. As another example, hardware implementing base station 102 may be replaced by new hardware that may require or benefit from different configuration settings from the previous hardware. It is assumed for present purposes that a network administrator (e.g., a human being responsible for base station 102) can at any time make updates to network configuration information 110. Conventional or other techniques for managing a wireless network base station can be used to facilitate such updates.

When network configuration information 110 is updated at base station 102, wireless devices 104 and/or portable wireless device 106 may lose their connection to wireless network 108. In order to re-establish the connection, wireless devices 104, 106 may require updated network access information 120. Conventionally, this would require a user to provide the updated network access information to each device 104, 106 in a separate manual transaction. Depending on the number of wireless devices 104, 106 and the nature of their user interfaces, this process can become quite time-consuming.

In accordance with certain embodiments of the present invention, a device that has updated network access information for wireless network 108 can provide the updated network access information to other devices that have previously (e.g., prior to the update) been joined to wireless network 108. In some instances, the providing of updated network access information can occur prospectively, before the update takes effect. For example, prior to implementing an update to network configuration information 110, base station 102 can send a notification of the update to devices 104, 106 that happen to be connected to wireless network 108 using the old network configuration information. The notification can include update network access information 120 that devices 104, 106 will be able to use to access wireless network 108 after the update takes effect. The notification can be secure to the extent that any communication between devices on wireless network 108 is secure; additional security layers or protocols can be implemented as desired. Specific examples of prospective notification are described below.

Prospectively providing updated information may not be practical in all situations, such as a hardware failure or security breach. Accordingly, certain embodiments of the present invention relate to reconfiguring wireless devices 104 after a change to network configuration information 110 has taken effect, referred to herein as a "network repair" process. For example, a user can provide updated network access information 120 to portable wireless device 106. Portable wireless device 106 can share the updated network information with wireless devices 104. For instance, when a wireless device 104 loses its ability to connect to wireless network 108, wireless device 104 can broadcast a request for new network credentials. Portable wireless device 106 can detect the broadcast and can respond by establishing a temporary ("ad hoc") point-to-point communication link with wireless device 104. Via the temporary point-to-point communication link, portable wireless device 106 can deliver updated network access information 120 to wireless device 104, and wireless device 104 can use updated network access information 120 to rejoin wireless network 108. Specific examples of wireless network repair are described below.

It will be appreciated that network environment 100 is illustrative and that variations and modifications are possible. Any number of disparate types of wireless devices can be connected to a wireless network, and devices can drop off and rejoin the network at any time. Further, while only one portable wireless device is shown, it is to be understood that any or all of the wireless devices can be portable devices.

The particular networking technologies and protocols can be varied, and the invention is not limited to Wi-Fi networks.

Figure 2:
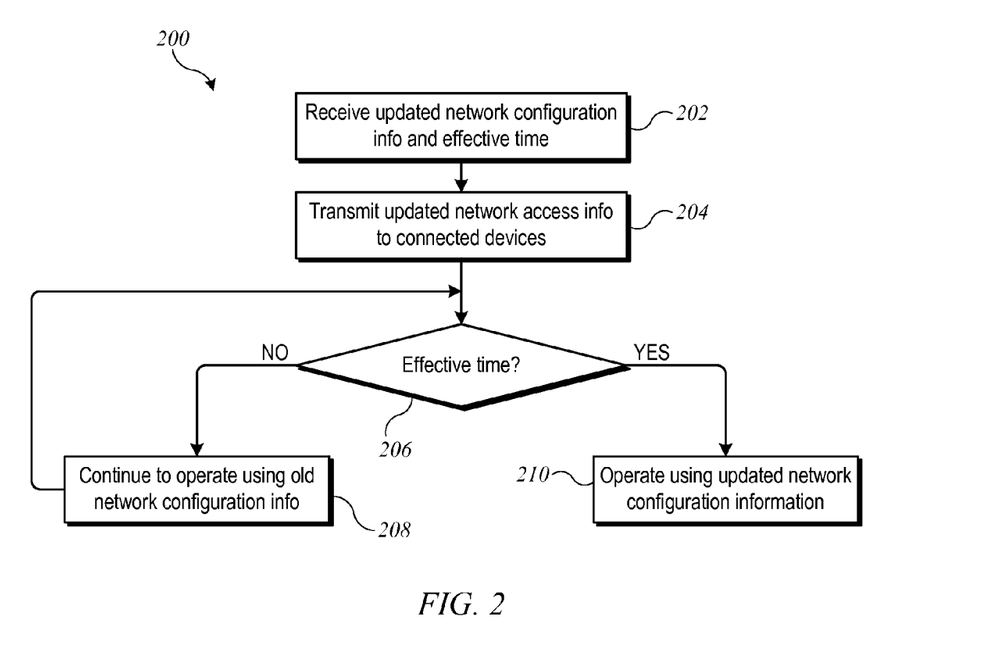
FIG. 2 is a flow diagram of a process for a scheduled configuration update according to an embodiment of the present invention.

In some embodiments, base station 102 can notify wireless devices 104, 106 of a scheduled update to network configuration information 110. The notification can be sent to each device connected to wireless network 108 prior to an effective time of the scheduled change. FIG. 2 is a flow diagram of a process 200 for a scheduled configuration change according to an embodiment of the present invention. Process 200 can be implemented, e.g., using program code executable by base station 102 of FIG. 1.

At block 202, base station 102 can receive updated network configuration information (e.g., a new security credential such as a password, new network name, or any other update to the configuration of wireless network 108) and an effective time at which base station 102 should begin to use the updated network configuration information. For example, base station 102 can have a user interface that allows a user to view and/or modify network configuration information. As another example, any of wireless devices 104, 106 that has a user interface can execute a network management utility program that allows a user to manage one or more wireless networks provided by base station 102 (e.g., setting or changing network names and security credentials; setting or changing network security protocols; viewing a list of connected wireless devices; setting access policies for specific wireless devices; etc.). Regardless of where the user interface is provided, the user interface can allow the user to schedule a configuration update. For example, the user interface can prompt the user to enter the updated configuration information and to specify the effective time for the update (which can be any time in the future relative to when the user enters the new information). Thus, for example, the user can set a new password for wireless network 108 and specify that the new password should replace the old password effective at midnight tonight.

At block 204, base station 102 can transmit updated network access information to any or all wireless devices 104, 106 connected to wireless network 108. For example, base station 102 can broadcast a notification message addressed to all devices on wireless network 108. The notification message can include a header indicating that the message contains updated network access information for a scheduled update and a data object containing the updated network access information as well as the effective time for the update. The notification message can be sent using any security protocols (e.g., encryption) that are currently implemented in wireless network 108; other security layers or protocols can also be used. The updated network access information can include any and all information that wireless devices 104, 106 will be able to use to access wireless network 108 after the effective time for the update. In some embodiments, the updated network access information can include just particular information elements that are being updated. Devices 104 and 106 can receive the notification message and store the updated network access information while continuing to use the previous network access information, as described below.

At block 206, base station 102 can determine whether the effective time for the updated network configuration information has arrived. If not, at block 208, base station 102 can continue to operate using old network configuration information (e.g., the network configuration that was in effect when the updated network configuration information was received at block 202). Once the effective time arrives, at block 210, base station 102 can begin to operate using the updated network configuration information. For example, if the updated network configuration includes a new security credential (e.g., password), then at block 210, base station 102 can require all wireless devices 104, 106 to provide proof that they are in possession of the new security credential. If a device fails to provide satisfactory proof, base station 102 can disconnect that device from wireless network 108 (e.g., by refusing to respond to messages from the device or to send messages to the device).

Figure 3:
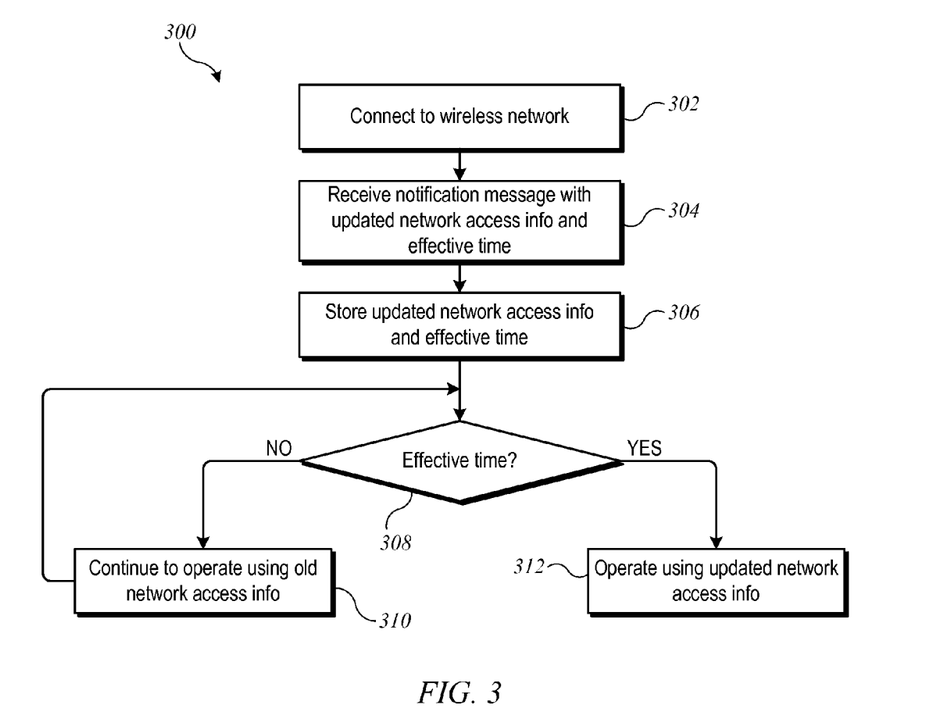
FIG. 3 is a flow diagram of a process for a scheduled configuration update according to an embodiment of the present invention.

Devices 104, 106 that receive the notification message from base station 102 can automatically begin using the updated network configuration information at the scheduled time. FIG. 3 is a flow diagram of a process 300 for a scheduled configuration change according to an embodiment of the present invention. Process 300 can be implemented, e.g., using program code executable by any of wireless devices 104, 106 of FIG. 1. Process 300 can begin at any time prior to the effective time of a scheduled update at block 206.

At block 302, wireless device 104 (or 106) can connect to wireless network 108, e.g., using stored network access information 120. While connected to wireless network 108, wireless device 104 can receive a notification message from base station 102, containing updated network access information and an effective time for the updated network access information. This notification message can be, e.g., the notification message sent at block 204 of process 200 described above.

At block 306, wireless device 104 can store the updated network access information and the effective time. The information can be stored as a scheduled update, in a storage area separate from storage allocated to network access information 120, so that the "old" network access information remains available at least until the effective time of the update.

At block 308, wireless device 104 can determine whether the effective time for the updated network configuration information has arrived. If not, at block 310, wireless device 104 can continue to operate using old network access information (e.g., the network access information that was in effect when the notification message was received at block 304). Once the effective time arrives, at block 312, wireless device 104 can begin to operate using the updated network access information. For example, wireless device 104 can copy the stored updated network access information into storage allocated to network access information 120, overwriting the old network access information. Other operations can also be implemented. For instance, if the updated network configuration includes a new security credential (e.g., password), then at block 312, wireless device 104 can provide proof to base station 102 that it is in possession of the new security credential. (In some instances, providing of proof can be prompted by a request from base station 102.) In this manner, the transition from the old network configuration to the updated network configuration can occur transparently to users.

It will be appreciated that processes 200 and 300 are illustrative and that variations and modifications are possible. Steps described as sequential may be executed in parallel, order of steps may be varied, and steps may be modified, combined, added or omitted. For instance, in some embodiments, if an update to the network configuration has been scheduled (but is not yet effective) at the time when a wireless device connects, the base station can provide the updated network access information to the wireless device whenever the wireless device happens to connect. Thus, it is not required that a wireless device be present on the network at the time the update is scheduled; as long as the wireless device connects prior to the effective time, the wireless device can still receive the updated information.

The time interval between receiving updated network configuration information at the base station and the effective time of the update can be varied as desired and can be as long or short as desired. For example, the time interval can be one minute, ten minutes, an hour, six hours, a day, or longer. The time interval can be specified by the user, e.g., as a relative interval ("ten minutes from now," etc.) or absolute effective time ("midnight tonight," etc.).

Notification messages can have any format desired, provided the format is recognizable to connected wireless devices 104 as a notification message indicating a scheduled network configuration update. A notification message can be transmitted as a broadcast message to all connected devices on the wireless network, as a multicast message to a subset of connected devices, or as a per-device unicast message to a specific device, as desired. In some embodiments, the notification message might not be recognized by some wireless devices 104, in which case these wireless devices may simply ignore the notification message.

Any type of network configuration information can be updated using scheduled update processes as described herein, including security credentials (e.g., password), network name (e.g., SSID), whether the network is a visible or hidden network, channel assignments, security protocols (e.g., encryption algorithms), packet size and/or formatting requirements, or any other aspect of network configuration.

A scheduled update can provide a transition of the wireless devices to the new network configuration that is transparent to the user. In some embodiments, the user can simply schedule an update to the base station and rely on the base station to distribute the updated network access information to all connected devices.

In some circumstances, however, a scheduled update might not be possible or desirable. For example, if base station hardware is being replaced due to a fault or failure, there might not be an opportunity for the base station to generate notification messages prior to the update taking effect. As another example, if an update is being made as a result of security concerns (e.g., a password that may have become compromised), it may not be desirable to announce the new configuration information to connected devices, one or more of which might be unauthorized. As yet another example, some wireless devices that are legitimately on the network might not be programmed to recognize a notification message from the base station providing updated network access information.

Accordingly, some embodiments of the present invention can implement after-the-fact network repair processes, in addition to or instead of scheduled updates. The network repair process can allow a wireless device that has lost access to a wireless network as a result of a configuration change to obtain updated network access information and rejoin the wireless network, with little or no user intervention.

Figure 4:
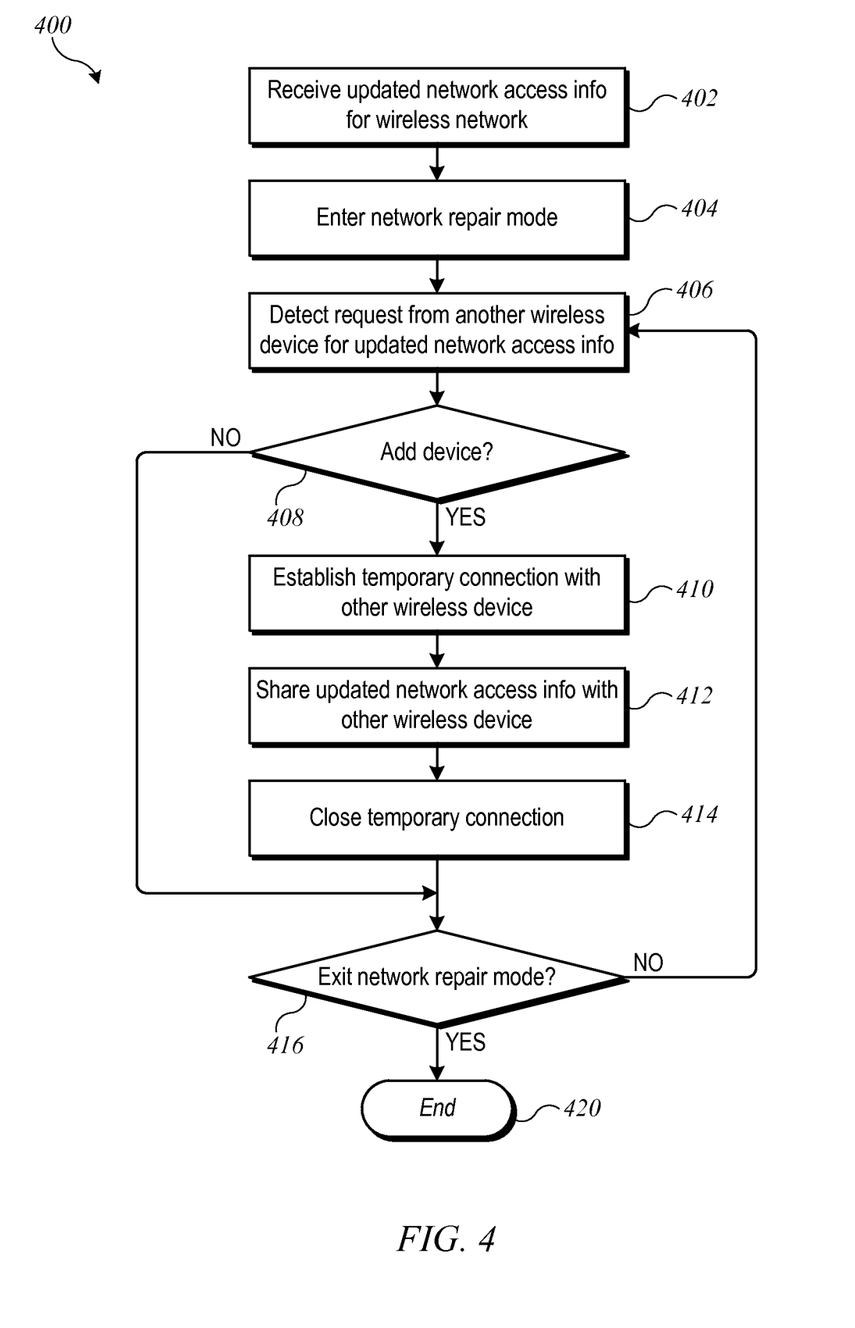
FIG. 4 is a flow diagram for a network repair process according to an embodiment of the present invention.

FIG. 4 is a flow diagram for a network repair process 400 according to an embodiment of the present invention. Process 400 can be implemented, e.g., using program code executable by portable wireless device 106 (or another wireless device 104) of FIG. 1. During execution of process 400 (or any portion thereof), portable wireless device 106 can be but does not need to be connected to wireless network 108.

At block 402, process 400 can receive updated network access information for wireless network 108. For example, the user can input the updated information via a user interface of portable wireless device 106. In some instances, portable wireless device 106 can use the updated network access information to rejoin wireless network 108 prior to performing other operations described herein.

At block 404, portable wireless device 106 can enter a network repair mode. For example, the user can provide input expressly instructing portable wireless device 106 to enter the network repair mode. In some embodiments, portable wireless device 106 can prompt the user to enter the network repair mode, e.g., after receiving updated network access information at block 402. In some embodiments, entry into the network repair mode can occur automatically (without user input); however, due to security considerations, it may be preferred to have the user control whether and when portable wireless device 106 enters the network repair mode.

While in the network repair mode, at block 406, portable wireless device 106 can detect a signal (e.g., a beacon or other broadcast signal) from another wireless device 104 that is requesting access to a wireless network. For example, wireless device 104 can be programmed such that if it loses its connection to wireless network 108 and is unable to reestablish the connection, wireless device 104 can begin a scanning process to locate wireless networks. The scanning process can include broadcasting signals that can be detected by wireless devices in the area. These signals can include, e.g., Wi-Fi-compliant beacon signals. Portable wireless device 106 can detect and respond to such signals.

For example, at block 408, portable wireless device 106 can determine whether the requesting wireless device should be added to wireless network 108. Various decision criteria can be used. In some embodiments, the decision can be based at least in part on whether the wireless device 104 that is making the request was previously (prior to the configuration change) visible to portable wireless device 106 on wireless network 108. In some embodiments, the decision can be based at least in part on whether the wireless device 104 that is making the request is currently in proximity to portable wireless device 106. In some embodiments, the decision can be based at least in part on user input indicating whether the wireless device 104 that is making the request should be allowed to join or rejoin wireless network 108. Specific examples of decision logic that can be implemented at block 408 are described below.

If portable wireless device 106 determines that wireless device 104 should be added, then at block 410, portable wireless device 106 can establish a temporary (or "ad hoc") connection with wireless device 104, and at block 412, portable wireless device 106 can provide updated network access information (e.g., any or all of the updated information received at block 402) to wireless device 104 via the temporary connection. Various techniques can be used to establish a temporary connection and provide information. In some embodiments, the techniques can be similar or identical to examples described in U.S. Patent Application Pub. No. 2012/0054493; other techniques can be used. In some embodiments, the temporary connection can use a different wireless communication medium from wireless network 108, as long as both wireless device 104 and portable wireless device 106 support the other medium. For example, if wireless device 104 and portable wireless device 106 both support Bluetooth® communication protocols and standards promulgated by the Bluetooth SIG (including Bluetooth® Classic and/or Bluetooth® Smart communication protocols, referred to collectively herein as "Bluetooth communication"), the devices can establish a temporary connection using Bluetooth communication. As another example, if wireless device 104 and portable wireless device 106 both support near-field communication (NFC), the temporary connection can be established using NFC.

At block 414, portable wireless device 106 can close the temporary connection. At this point, wireless device 104 has the information it needs to reconnect to wireless network 108 and can proceed to do so. Accordingly, subsequent communication between portable wireless device 106 and wireless device 104 can take place via wireless network 108.

Through execution of blocks 406 through 414, portable wireless device 106 can provide updated network configuration information to one wireless device 104. In some embodiments, blocks 406 through 414 can be executed repeatedly with different wireless devices 104 for as long as portable wireless device 106 remains in the network repair mode.

At block 416, portable wireless device 106 can determine whether to exit the network-repair mode. For example, the user can provide input expressly instructing portable wireless device 106 to exit the network repair mode. As another example, portable wireless device 106 can maintain a list of wireless devices 104 to be reconnected (e.g., all previously visible wireless devices 104 listed in device list 132 as described below) and can automatically exit network repair mode if all wireless devices 104 on the list have received the updated network access information. As yet another example, portable wireless device 106 can automatically exit the network repair mode if a specified timeout period (e.g., one minute, two minutes, or five minutes) elapses without detecting a request from a wireless device. As still another example, portable wireless device 106 can automatically exit the network repair mode if it leaves the area in which wireless network 108 operates (e.g., if portable wireless device 106 moves out of communication range of base station 102). Other conditions for exiting network repair mode can be established as desired. As long as portable wireless device 106 remains in the network repair mode, wireless devices 104 can obtain updated network access information from portable wireless device 106 with little or no user intervention.

Process 400 can end (block 420) when portable wireless device 106 exits the network repair mode. In some embodiments, portable wireless device 106 can re-enter the network repair mode (e.g., based on user input) even if there has not been a further update to the network access information.

Figure 5:
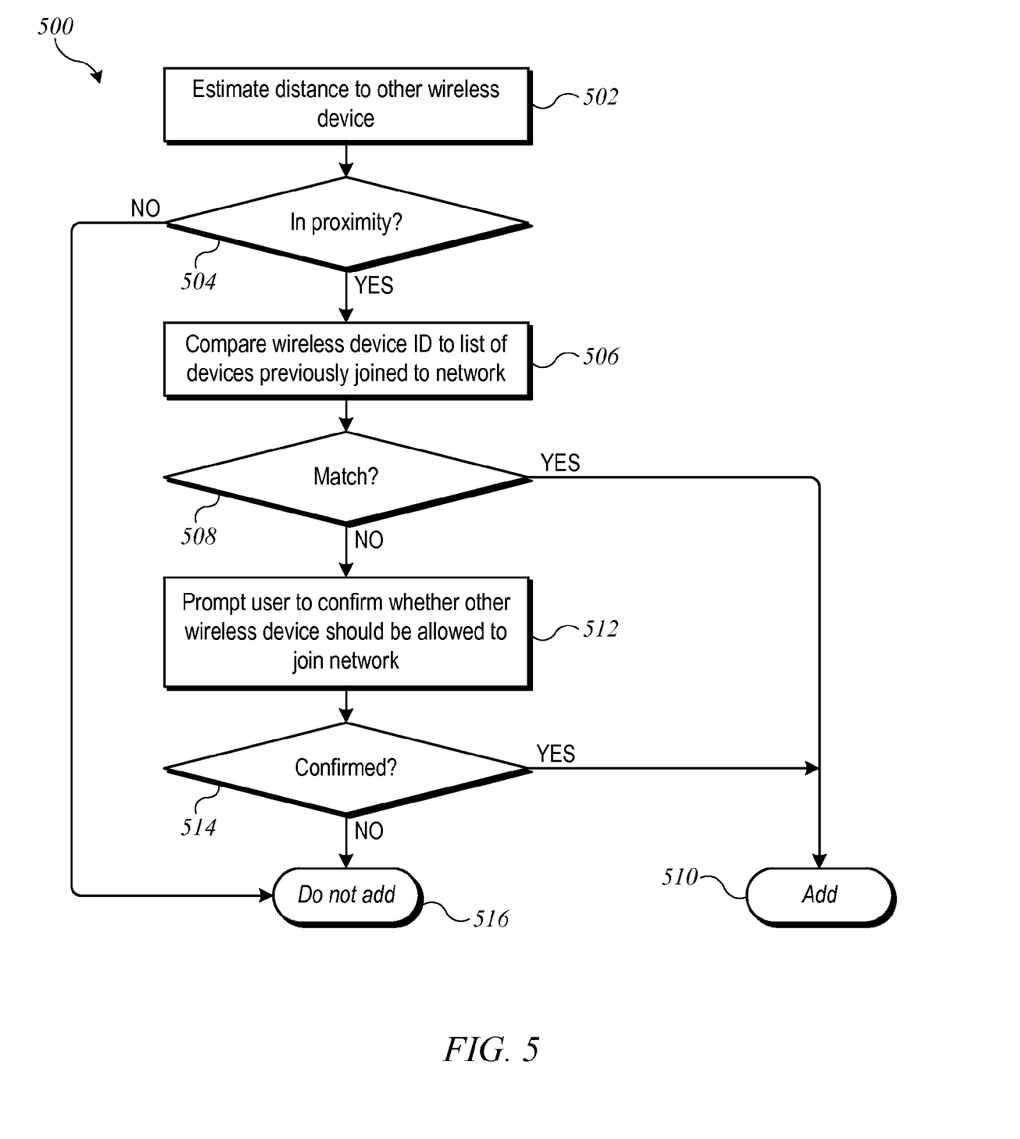
FIG. 5 is a flow diagram of a decision process usable during a network repair process according to an embodiment of the present invention.

As noted above, portable wireless device 106 can make a case-by-case decision (e.g., at block 408 of FIG. 4) as to whether to provide updated network access information to each wireless device 104 that requests it. This can help to avoid inadvertently providing network access information to an unauthorized wireless device that just happens to be broadcasting a request for network information while portable wireless device 106 is in the network repair mode. FIG. 5 is a flow diagram of a decision process 500 that can be implemented, e.g., at block 408 of process 400.

At block 502, process 500 can estimate the distance between portable wireless device 106 and a particular wireless device 104 that is requesting network access. For example, portable wireless device 106 can analyze the signal strength of a signal received from wireless device 104 to estimate the distance between the devices. The signal used to estimate distance can be the beacon signal from wireless device 104 or a different signal, including a signal sent using a different wireless communication medium (e.g., NFC or Bluetooth LE). In some embodiments, the distance estimate can be a binary determination (e.g., for a given wireless communication medium, either the devices are within signaling range of each other or not).

At block 504, process 500 can determine whether the estimated distance between the devices satisfies a criterion for proximity of portable device 106 to wireless device 104. For instance, a threshold criterion can be applied to the estimated distance (e.g., threshold of one foot, three feet, six feet), such that distances less than the threshold are considered in proximity while distances greater than the threshold are considered not in proximity. If the distance estimate is binary, the proximity criterion can be, e.g., that the devices are in range. It is to be understood that there is no requirement that wireless devices 104 be in proximity to each other or to base station 102. In some embodiments, a user can cause the proximity criterion to be satisfied or not with respect to a particular wireless device 104 simply by moving portable wireless device 106 closer to or farther from that wireless device 104.

At block 506, process 500 can compare an identifier received from wireless device 104 (e.g., encoded in the beacon or other signal requesting network access) to a list of devices that were previously (i.e., prior to receiving the most recent update to the network configuration information) joined to wireless network 108. This list can be constructed prior to execution of process 500 and provided to or maintained by portable wireless device 106. For example, whenever portable wireless device 106 connects to wireless network 108, other wireless devices 104 that are connected to portable wireless device 106 can become visible to portable wireless device 106. Accordingly, portable wireless device 106 can maintain device list 132 of visible devices, and device list 132 can be persistently stored so that it remains available even if portable wireless device 106 disconnects from wireless network 108. When an update to network access information 120 occurs, portable wireless device 106 can save the state of device list 132 immediately prior to the update and can use this list at block 506 to identify previously visible devices. As another example, base station 102 can maintain a list of devices that have been connected to wireless network 108 (optionally subject to a time constraint, e.g., within the last 24 or 48 hours or the like) and can provide the list to portable wireless device 106, e.g., when portable wireless device 106 enters the network repair mode.

If, at block 508, the identifier received from wireless device 104 matches an entry in the list of devices that were previously joined to wireless network 108, process 500 can end at block 510 with a decision to add wireless device 104, in which case the "Yes" branch at bock 408 of FIG. 4 can be taken.

If, at block 508, the identifier received from wireless device 104 does not match an entry in the list of devices that were previously joined to wireless network 108, then at block 512, process 500 can prompt the user to confirm whether wireless device 104 should be allowed to join wireless network 108. For example, portable wireless device 106 can present a prompt at its user interface requesting the user to confirm or deny the access request. The prompt can include any identifying information for wireless device 104 that is available to portable wireless device 106 (e.g., a device name or other information included in the beacon signal from wireless device 104). At block 514, process 500 can determine whether the user confirms or denies the request. If the user confirms, process 500 can end at block 510 with a decision to add wireless device 104, in which case the "Yes" branch at bock 408 of FIG. 4 can be taken. If not, process 500 can end at block 516 with a decision not to add wireless device 104, in which case the "No" branch at block 408 of FIG. 4 can be taken.

It will be appreciated that the network repair process described herein is illustrative and that variations and modifications are possible. Steps described as sequential may be executed in parallel, order of steps may be varied, and steps may be modified, combined, added or omitted. For instance, different criteria for determining whether to provide updated network access information to a particular wireless device can be implemented. Different types of temporary connections (e.g., different wireless communication media) can be used for communicating updated network access information to different wireless devices, depending on the capabilities of the particular wireless device and portable wireless device. In some embodiments, the broadcast beacon from the wireless device can indicate which type(s) of temporary connection it supports for purposes of receiving updated network access information.

Where processes such as process 400 are implemented, a wireless device can rejoin a wireless network by broadcasting a beacon (or request message) that is detectable by a portable wireless device. If the portable wireless device provides updated network access information, the wireless device can use that information to rejoin the wireless network. In some embodiments, the broadcast beacon from the wireless device need not include any particular information, beyond an identifier of the wireless device sufficient to allow another device to respond to the broadcast. Other information can be included if desired. For instance, a wireless device that was previously on wireless network 108 can include in its beacon an identifier of wireless network 108 (e.g., the network name or SSID that wireless device 104 last used to connect to wireless network 108, which might or might not match the current network name or SSID), and portable wireless device 106 can selectively respond to beacons that include the wireless network identifier for the network that portable wireless device 106 is repairing.

Accordingly, processes such as processes 400 can simplify the task of providing updated network access information to wireless devices. For instance, a user can update the configuration of base station 102, provide the updated network access information to portable wireless device 106, instruct portable wireless device 106 to enter the network repair mode, then walk (or otherwise move) around in the area where wireless network 108 operates while wearing or carrying portable wireless device 106. As portable wireless device 106 comes into proximity with various wireless devices 104, portable wireless device 106 can provide updated network access information to each wireless device 104. In some embodiments, the providing of updated network access information from portable wireless device 106 to wireless device 104 can happen without any action by the user (other than perhaps moving around in the environment). In some embodiments, a simple user action, such as bringing portable wireless device 106 into proximity with wireless device 104, can be required; depending on implementation, bringing the devices into proximity can happen as the user moves around in the environment without the user having to remember where specific wireless devices are located.

Embodiments described herein can be implemented in electronic devices that can be of generally conventional design and adapted to implement processes similar or identical to the processes described above.

Figure 6:
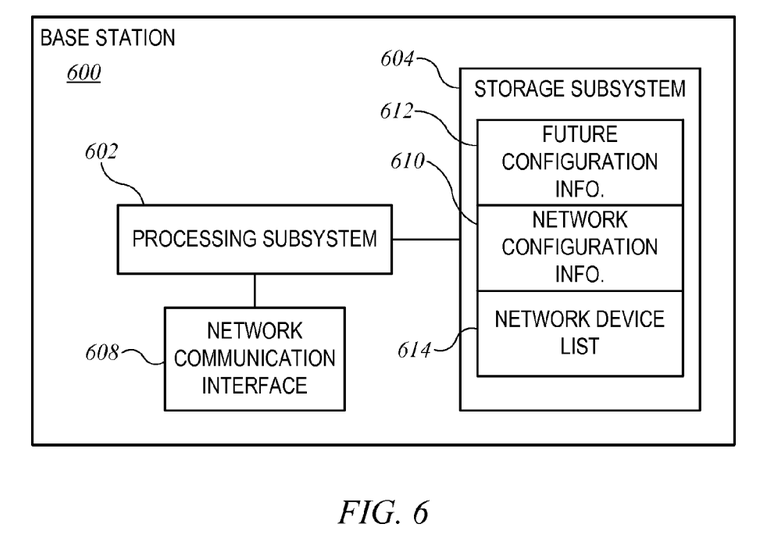
FIG. 6 is a simplified block diagram of a base station according to an embodiment of the present invention.

FIG. 6 is a simplified block diagram of a base station 600 according to an embodiment of the present invention. Base station 600 can implement any or all of the functions, behaviors, and capabilities described herein as being performed by a base station (including base station 102 of FIG. 1), as well as other functions, behaviors, and capabilities not expressly described. Base station 600 can include processing subsystem 602, storage subsystem 604, and network interface 608. Base station 600 can also include other components (not explicitly shown) such as a battery, power controllers, peripheral device interfaces, user interface components, and the like. In some embodiments, base station 600 can provide other capabilities in addition to supporting a wireless network.

Storage subsystem 604 can be implemented, e.g., using disk, flash memory, or any other non-transitory storage medium, or a combination of media, and can include volatile and/or non-volatile storage media. In some embodiments, storage subsystem 604 can store one or more programs to be executed by processing subsystem 602, including programs to implement any or all operations described herein as being performed by a base station. For example, storage subsystem 604 can store programs to manage network configuration information, including receiving updated network configuration information and implementing the update either immediately or at a later scheduled time. In the case of a scheduled update, the program can include code to generate notification messages to wireless devices, e.g., as described above with reference to FIG. 2. Storage subsystem 604 can also store network configuration information For example, storage subsystem 604 can store current network configuration information 610 (e.g., security credentials and/or other information as described above), future network configuration information 612 (e.g., configuration updates for a scheduled network configuration update as described above), and network device list 614 (e.g., a list of wireless devices that have joined the wireless network).

Processing subsystem 602 can be implemented as one or more integrated circuits, e.g., one or more single-core or multi-core microprocessors or microcontrollers, examples of which are known in the art. In operation, processing subsystem 602 can control the operation of base station 600. In various embodiments, processing subsystem 602 can execute a variety of programs in response to program code and can maintain multiple concurrently executing programs or processes. At any given time, some or all of the program code to be executed can be resident in processing subsystem 602 and/or in storage media such as storage subsystem 604.

Through suitable programming, processing subsystem 602 can provide various functionality for base station 600. For example, in some embodiments, processing subsystem 602 can implement various processes (or portions thereof) described above as being implemented by a base station. Processing subsystem 602 can also execute other programs to control other functions of base station 600, including programs that may be stored in storage subsystem 604. In some embodiments, these programs may interact with wireless devices, e.g., by generating messages to be sent to one or more wireless devices and/or receiving messages from a wireless device.

Network communication interface 608 can provide data communication capability for base station 600, including transmitting and receiving signals to implement or support a wireless network such as wireless network 108 described above. In some embodiments, network communication interface 608 can include radio frequency (RF) transceiver components for accessing wireless voice and/or data networks (e.g., using cellular telephone technology, data network technology such as 3G, 4G/LTE, IEEE 802.11 family standards (e.g., Wi-Fi network technology), or other mobile communication technologies, or any combination thereof), components for short-range wireless communication (e.g., using Bluetooth and/or Bluetooth LE standards, NFC, etc.), and/or other components. In some embodiments, network communication interface 608 can provide wired network connectivity (e.g., Ethernet) in addition to a wireless interface. Network communication interface 608 can be implemented using a combination of hardware (e.g., driver circuits, antennas, modulators/demodulators, encoders/decoders, and other analog and/or digital signal processing circuits) and software components. In some embodiments, network communication interface 608 can support multiple communication channels concurrently, using the same transport or different transports.

It will be appreciated that base station 600 is illustrative and that variations and modifications are possible. Base station 600 can provide additional functionality not specifically described (e.g., connection to a wired peripheral device, mass data storage capability using an internal disk or the like, etc.). In some embodiments, base station 600 can include a wired network interface to connect to a wide area network (e.g., the Internet) and a wireless interface to support a wireless local-area network (e.g., a Wi-Fi network). In some embodiments, a wireless network can be extended, e.g., by providing multiple intercommunicating base stations; conventional or other techniques can be used to synchronize the network configuration information among the base stations, share information among the base stations about wireless devices joined to the network, and so on. Thus, while the foregoing description refers to a single base station, those skilled in the art will be able to adapt the described techniques to a wireless network with multiple intercommunicating base stations.

Further, while the base station is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 7:
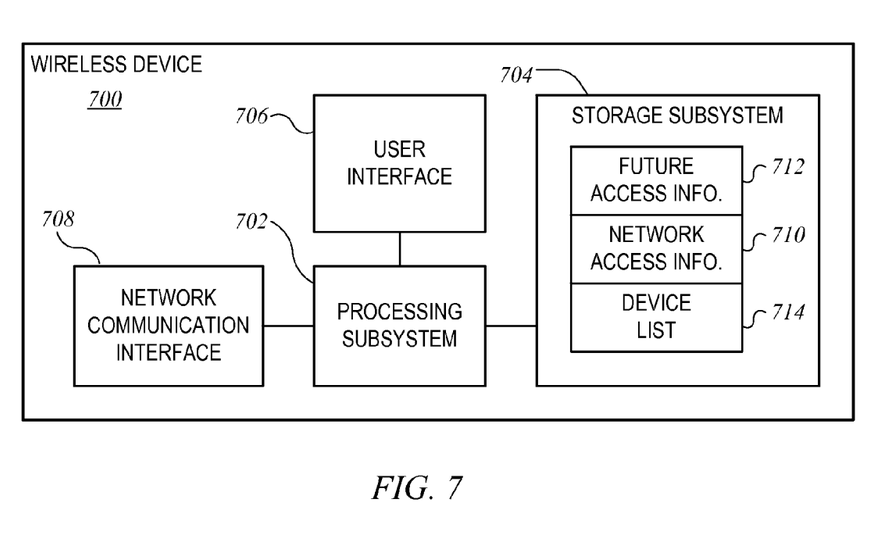
FIG. 7 is a simplified block diagram of a wireless device according to an embodiment of the present invention.

FIG. 7 is a simplified block diagram of a wireless device 700 according to an embodiment of the present invention. Wireless device 700 can implement any or all of the functions, behaviors, and capabilities described herein as being performed by a wireless device (including portable wireless device 106 as well as other wireless devices 104 of FIG. 1), as well as other functions, behaviors, and capabilities not expressly described. Wireless device 700 can include processing subsystem 702, storage subsystem 704, user interface 706, and network interface 708. Wireless device 700 can also include other components (not explicitly shown) such as a battery, power controllers, and other components operable to provide various enhanced capabilities. In various embodiments, wireless device 700 can be implemented in a desktop or laptop computer, tablet computer, smart phone, other mobile phone, wearable device, media device. household appliance, environmental control device, security device, or any other device that is connectable to a wireless network.

Storage subsystem 704 can be implemented, e.g., using disk, flash memory, or any other non-transitory storage medium, or a combination of media, and can include volatile and/or non-volatile storage media. In some embodiments, storage subsystem 704 can store one or more application and/or operating system programs to be executed by processing subsystem 702, including programs to implement any or all operations described herein as being performed by a wireless device (including a portable wireless device). For example, storage subsystem 702 can store a network maintenance program, which can be an operating system program or application program. A network maintenance program can include code to implement network repair processes such as process 400 described above and/or code to recognize notification messages related to scheduled network configuration updates as described above with reference to process 300. Storage subsystem 704 can also store information useful for network connectivity and/or network repair. For example, storage subsystem 704 can store current network access information 710 (e.g., security credentials and/or other information as described above), future network access information 712 (e.g., information received in connection with a scheduled network configuration update as described above), and network device list 714 (e.g., a list of wireless devices that have been visible to wireless device 700 via a particular wireless network, as described above). It should be understood that different instances of a wireless device can store different subsets of this information, or all of it, as desired.

User interface 706 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 706 to invoke the functionality of wireless device 700 and can view and/or hear output from wireless device 700 via output devices of user interface 706.

Processing subsystem 702 can be implemented as one or more integrated circuits, e.g., one or more single-core or multi-core microprocessors or microcontrollers, examples of which are known in the art. In operation, processing subsystem 702 can control the operation of wireless device 700. In various embodiments, processing subsystem 702 can execute a variety of programs in response to program code and can maintain multiple concurrently executing programs or processes. At any given time, some or all of the program code to be executed can be resident in processing subsystem 702 and/or in storage media such as storage subsystem 704.

Through suitable programming, processing subsystem 702 can provide various functionality for wireless device 700. For example, in some embodiments, processing subsystem 702 can implement various processes (or portions thereof) described above as being implemented by a wireless device (including a portable wireless device). Processing subsystem 702 can also execute other programs to control other functions of wireless device 700, including programs that may be stored in storage subsystem 704. In some embodiments, these programs may interact with a base station and/or another wireless device, e.g., by generating messages to be sent to the base station or other wireless device and/or receiving messages from the base station or other wireless device.

Network communication interface 708 can provide voice and/or data communication capability for wireless device 700. In some embodiments, network communication interface 708 can include radio frequency (RF) transceiver components for accessing wireless data networks (e.g., using data network technology such as 3G, 4G/LTE, IEEE 802.11 family standards (e.g., Wi-Fi network technology), or other mobile communication technologies, or any combination thereof), components for short-range wireless communication (e.g., using Bluetooth and/or Bluetooth LE standards, NFC, etc.), and/or other components. In some embodiments, network communication interface 708 can provide wired network connectivity (e.g., Ethernet) in addition to a wireless interface. Network communication interface 708 can be implemented using a combination of hardware (e.g., driver circuits, antennas, modulators/demodulators, encoders/decoders, and other analog and/or digital signal processing circuits) and software components. In some embodiments, network communication interface 708 can support multiple communication channels concurrently, using the same transport or different transports.

It will be appreciated that wireless device 700 is illustrative and that variations and modifications are possible. A wireless device can be portable or non-portable as desired, and any number of portable and/or non-portable wireless devices can be joined to a single wireless network. Wireless devices can have functionality not described herein (e.g., voice communication via cellular telephone networks; control mechanisms and/or interfaces for operating an appliance such as a thermostat or door lock; ability to interact with the user to provide personal information, play games, access content via the wireless network and/or locally stored content; etc.) and can include components appropriate to such functionality. In some embodiments, a wireless device might also incorporate base station functionality.

Further, while a wireless device is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

While the invention has been described with respect to specific embodiments, one skilled in the art will recognize that numerous modifications are possible. Any type of network configuration information can be updated, and any updates to the network configuration can be propagated to wireless devices in the manner described here. The various processes can be combined. For example, a user can schedule an update to network configuration information for a wireless network, and the base station can generate notification messages to any or all wireless devices that happen to be connected to the network during the time between the scheduling of the update and the effective time of the update. However, it is understood that not all wireless devices need to be connected to the network at all times, and a wireless device might not receive a notification message. Further, it is also understood that there can be wireless devices on a wireless network that are not able to recognize or process the notification message. In such instances, a network repair process as described above can be used to provide updated network access information to wireless devices that either did not receive or were not able to process the notification message. As another example, a portable wireless device can receive a notification message for a scheduled update from a wireless network base station; at or after the effective time, the portable wireless device can prompt the user to enter the network repair mode, thereby allowing the portable wireless device to distribute the updated network access information to other wireless devices that might not have received or processed the notification message.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
   joining, by a portable wireless device, a wireless network using initial network access information;
   receiving, by the portable wireless device, updated network access information for the wireless network, the updated network access information indicating an update to a network configuration of the wireless network;
   detecting, by the portable wireless device, that another wireless device is requesting to join the wireless network;
   determining, by the portable wireless device, that the other wireless device had joined the wireless network prior to the update to the network configuration of the wireless network; and
   providing, by the portable wireless device, the updated network access information to the other wireless device in response to determining that the other wireless device had joined the wireless network prior to the update to the network configuration of the wireless network.

2. The method of claim 1 further comprising:
   after joining the wireless network, obtaining, by the portable wireless device, a list of devices that have joined the wireless network,
   wherein determining that the wireless device was previously joined to the wireless network includes comparing a device identifier received from the other wireless device to the list of devices that have joined the wireless network.

3. The method of claim 2 wherein obtaining the list of devices includes constructing a list of devices that are visible to the portable wireless device on the wireless network.

4. The method of claim 1 further comprising:
   determining that a proximity criterion between the portable wireless device and the other wireless device is satisfied, wherein providing the updated network access information is performed while the proximity criterion is satisfied.

5. The method of claim 4 wherein the proximity criterion is based on a signal strength of a signal received by the portable wireless device from the other wireless device.

6. The method of claim 1 further comprising:
   receiving, at the portable wireless device, a user instruction to enter a network repair mode; and
   entering, by the portable wireless device, the network repair mode in response to the user instruction,
   wherein providing the updated network access information to the other wireless device is performed while the portable wireless device is in the network repair mode.

7. The method of claim 1 wherein the updated network access information includes one or both of a network name or a network security credential.

8. A portable wireless device comprising:
   a storage subsystem to store network access information;
   a network communication interface to connect to a wireless network using the network access information; and
   a processing subsystem coupled to the storage subsystem and the wireless network interface, the processing subsystem being configured to:
      receive updated network access information for the wireless network, the updated network access information indicating an update to a network configuration of the wireless network; and
      enter a network repair mode in response to a user instruction,
   the processing subsystem being further configured to, while in the network repair mode:
      detect that another wireless device is requesting to join the wireless network;
      determine that the other wireless device had joined the wireless network prior to the update to the network configuration of the wireless network; and
      provide the updated network access information to the other wireless device in response to determining that the other wireless device had joined the wireless network prior to the update to the network configuration of the wireless network.

9. The portable wireless device of claim 8 wherein the processing subsystem is further configured to prompt the user to instruct entry into the network repair mode in response to receiving the updated network access information.

10. The portable wireless device of claim 8 wherein the processing subsystem is further configured to maintain a list of other devices visible to the portable wireless device while joined to the wireless network and to determine that the other wireless device had joined to the wireless network based at least in part on the list.

11. The portable wireless device of claim 8 wherein the processing subsystem is further configured to:
   receive, from a base station of the wireless network, a notification message indicating a scheduled update to the network access information, the notification message including the updated network access information and an effective time of the scheduled update; and instruct the network communication interface to begin using the updated network access information to access the wireless network after the effective time of the scheduled update.

12. The portable wireless device of claim 11 wherein the processing subsystem is further configured to prompt the user to instruct entry into the network repair mode at or after the effective time of the scheduled update.

13. The portable wireless device of claim 8 wherein the wireless network uses a first wireless communication medium and wherein the processing subsystem is further configured to provide the updated network access information to the other wireless device using a second wireless communication medium different from the first wireless communication medium.

14. The portable wireless device of claim 13 wherein the first wireless communication medium comprises a Wi-Fi network and the second wireless communication medium comprises Bluetooth communication.

15. The portable wireless device of claim 8 wherein the processing subsystem is further configured to receive the updated network access information from a base station of the wireless network.

16. The portable wireless device of claim 8 further comprising:
a user interface,
wherein the processing subsystem is further configured to receive the updated network access information via the user interface.

17. A computer-readable storage medium having stored therein program instructions that, when executed by a processor in a portable wireless device, cause the portable wireless device to perform a method comprising:
joining a wireless network using initial network access information;
receiving updated network access information for the wireless network, the updated network access information indicating an update to a network configuration of the wireless network;
detecting that another wireless device is requesting to join the wireless network;
determining that the other wireless device had joined the wireless network prior to the update to the network configuration of the wireless network; and
providing the updated network access information to the other wireless device in response to determining that the other wireless device had joined the wireless network prior to the update to the network configuration of the wireless network.

18. The computer-readable storage medium of claim 17 wherein the method further comprises:
after joining the wireless network, obtaining a list of devices that have joined the wireless network,
wherein determining that the wireless device was previously joined to the wireless network includes comparing a device identifier received from the other wireless device to the list of devices.

19. The computer-readable storage medium of claim 18 wherein obtaining the list of devices includes constructing a list of devices that are visible to the portable wireless device on the wireless network.

20. The computer-readable storage medium of claim 18 wherein obtaining the list of devices includes obtaining the list from a base station of the wireless network.

* * * * *